(12) United States Patent
Kloeppel et al.

(10) Patent No.: US 6,594,883 B2
(45) Date of Patent: Jul. 22, 2003

(54) APPARATUS AND METHOD FOR SETTING BEARING GAPS IN AN ELECTRIC MOTOR

(75) Inventors: Klaus D. Kloeppel, Watsonville, CA (US); Troy M. Herndon, San Jose, CA (US)

(73) Assignee: Seagate Technology LLC, Scotts Valley, CA ( * ) Notice: Subject to any disclaimer, the term of this patent is extended or adjusted under 35 U.S.C. 154(b) by 0 days.

(21) Appl. No.: 09/881,947

(22) Filed: Jun. 15, 2001

(65) Prior Publication Data

US 2002/0053138 A1 May 9, 2002

Related U.S. Application Data

(60) Provisional application No. 60/247,327, filed on Nov. 9, 2000.

(51) Int. Cl.[7] .............................................. H02K 15/00
(52) U.S. Cl. .................... 29/596; 29/898; 29/898.07; 29/525
(58) Field of Search ............... 29/598, 898, 898.07, 29/525, 724, 426.1

(56) References Cited

U.S. PATENT DOCUMENTS 4,200,971 A * 5/1980 Shimizu et al. ............... 29/598
4,722,619 A * 2/1988 Reiser et al. .................. 384/585

* cited by examiner

Primary Examiner—David J. Walczak
(74) Attorney, Agent, or Firm—Moser, Patterson & Sheridan, LLP

(57) ABSTRACT

An apparatus and method for setting a gap in a hydrodynamic bearing of a disc drive spindle motor. The invention comprises placing an end of the shaft into shaft support apertures in the hub, fitting a thrust bearing counterplate into a recess defined by an annular retaining flange that is proximate the end of the shaft, and deforming the counterplate to form a gap between the end of the shaft and a surface of the counterplate.

4 Claims, 9 Drawing Sheets

APPARATUS AND METHOD FOR SETTING BEARING GAPS IN AN ELECTRIC MOTOR

CROSS-REFERENCE TO RELATED APPLICATION

This application is based on U.S. Provisional Application, Ser. No. 60/247,327, entitled "PRESS RING AND LASER WELD", filed Nov. 9, 2000, assigned to the Assignee of this application incorporated herein by reference, the priority of which is hereby claimed.

FIELD OF THE INVENTION

The invention relates to the field of electric motor assembly. More specifically, the invention relates to a method for setting a bearing gap in an electric motor.

BACKGROUND OF THE INVENTION

Disc drive memory systems have been used in computers for many years for storage of digital information. Information is recorded on concentric memory tracks of a magnetic disc medium, the actual information being stored in the form of magnetic transitions within the medium. The discs themselves are rotatably mounted on a spindle. The information is accessed by using read/write heads generally located on a pivoting arm that moves radially over the surface of the disc. The read/write heads or transducers must be accurately aligned with the storage tracks on the disc to ensure proper reading and writing of information.

During operation, the discs are rotated at very high speeds within an enclosed housing by using an electric motor generally located inside a hub that supports the discs. One type of motor in common use is known as an in-hub or in-spindle motor. Such in-spindle motors typically have a spindle mounted using two ball or hydrodynamic bearing systems to a motor shaft disposed in the center of the hub.

In a hydrodynamic bearing, a lubricating fluid such as air, gas or oil provides a bearing surface between two relatively rotating members, typically a shaft and surrounding sleeve. A volume containing the lubricating fluid is typically capped with a bearing counterplate. The counterplate is positioned proximate an end of the shaft and is spaced from the shaft by a small gap. To effectively form hydrodynamic bearings, the volume must be consistently and accurately formed. As such, the gap between the counterplate and the shaft must be repeatable from disc drive to disc drive in the manufacturing process.

Therefore, there is a need in the art for setting a gap for a hydrodynamic bearing using an accurate and repeatable method.

SUMMARY OF THE INVENTION

An apparatus and method for setting a gap in a hydrodynamic bearing of a disc drive spindle motor is provided. The invention comprises placing an end of a shaft into shaft support aperture in the hub, fitting a thrust bearing counterplate into a recess defined by an annular retaining flange that is proximate the end of the shaft, and deforming the counterplate to form a gap between the end of the shaft and a surface of the counterplate.

In one embodiment of the invention, the method for setting a gap comprises assembling a spindle motor having a rotor hub with the thrust bearing counterplate affixed to the top, an axial shaft and a radial bearing for the shaft. After the components of the motor are assembled, a ring is press fit into a recess defined by an annular retaining flange formed in the rotor hub that is annularly disposed about the thrust bearing counterplate, the press-fit ring squeezes the thrust bearing in the rotor hub. The pressure exerted on the thrust bearing counterplate causes the counterplate to deform outward from the center to its ends. The distortion of the thrust bearing creates a gap between the thrust bearing counterplate and the rotor shaft. The gap created is both precise and repeatable.

In another embodiment of the invention, the method for creating a precise gap in a hydrodynamic bearing comprises assembly of a press fit ring to a recess in a rotor hub before assembling the thrust bearing counterplate. The thrust bearing counterplate is pressed fit in place and laser welded to the rotor hub. After welding, the counterplate to the rotor hub, the press fit ring is removed. The removal of the press fit ring creates a tensional force that causes a tortional effect in the thrust bearing. The tortional effect is significant enough to produce a gap similar to that of the first embodiment and is also both precise and repeatable.

In yet another embodiment of the present invention, the method for creating a precise gap in a hydrodynamic bearing comprises assembly of the rotor hub, including but not limited to, assembly of the shaft and bearings in the rotor hub. After the thrust bearing is assembled, it is laser welded in place. This laser welding is different than that of the previous embodiment. In this embodiment, the laser's depth and penetration of both the hub and the bearing material is much greater. After the weld is completed, the assembly is allowed to cool. During the cooling process, the previously welded material begins to shrink. This contraction of the material causes tensional forces to be exerted on the thrust bearing counterplate. As cooling increases, tensional forces increase until a plastic deformation occurs in the thrust bearing counterplate and a gap is formed between the shaft and the thrust bearing counterplate. As in the previous embodiments, the gap created is both precise and repeatable.

This invention is especially useful in disc drive spindle motors having hydrodynamic bearing motors, in that it provides a more effective and efficient way of assembling hydrodynamic bearings and disc drive spindle motors. Additionally, the invention may be useful for setting gaps in hydrodynamic bearings of other types of motors.

BRIEF DESCRIPTION OF THE DRAWINGS

The teachings of the invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE PREFERRED EMBODIMENTS

Figure 1:
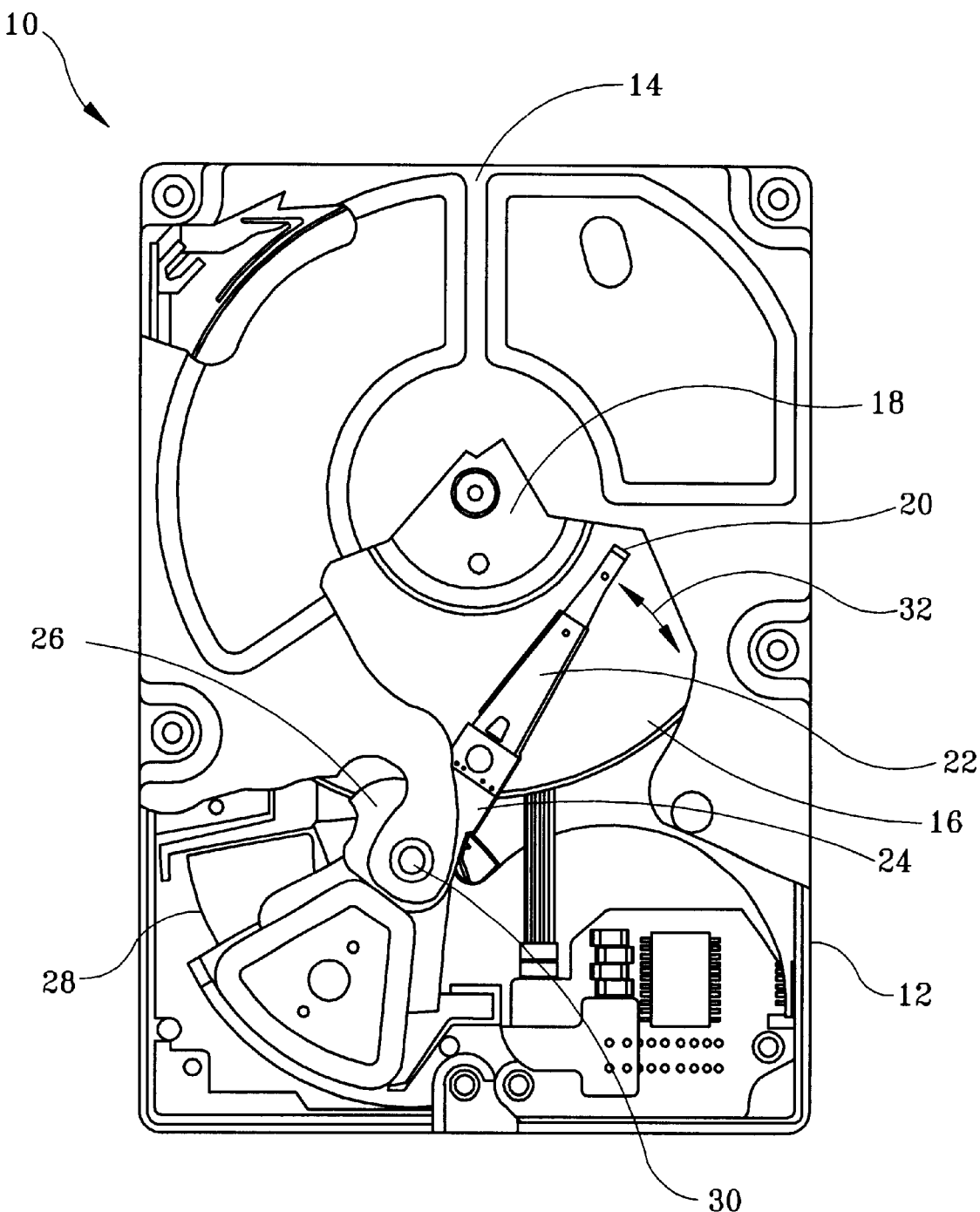
FIG. 1 is a top plan view of a disc drive data storage device in accordance with the invention.

The invention comprises an apparatus and method for setting bearing gaps for hydrodynamic bearings in an electric motor. FIG. 1 is a plan view of a typical disc drive 10 wherein the invention is useful. Disc drive 10 comprises a housing base 12 and a top cover 14. The housing base 12 is combined with top cover 14 to form a sealed environment to protect the internal components from contamination by elements from outside the sealed environment.

The base and top cover arrangement shown in FIG. 1 is common in the industry. However, other arrangements of the housing components have been frequently used, and the invention is not limited to the configuration of the disc drive housing. For example, disc drives have been manufactured using a vertical split between two housing members. In such drives, that portion of the housing half that connects to the lower end of the spindle motor is analogous to base 12, while the opposite side of the same housing member, that is connected to or adjacent the top of the spindle motor, is functionally the same as the top cover 14.

Disc drive 10 further comprises a disc pack 16 that is mounted for rotation on a spindle motor (not shown) by a disc clamp 18. Disc pack 16 includes one or more of individual discs that are mounted for co-rotation about a central axis. Each disc surface has an associated head 20 for communicating with the disc surface. In the example shown in FIG. 1, heads 20 are supported by flexures 22 that are in turn attached to head mounting arms 24 of an actuator body 26. The actuator body 26 shown in FIG. 1 is of the type known as a rotary moving coil actuator and includes a voice coil motor (VCM), shown generally at 28. The voice coil motor 28 rotates the actuator body 26 with its attached heads 20 about a pivot shaft 30 to position the heads 20 over a desired data track along an arcuate path 32. While a rotary actuator is illustratively shown in FIG. 1, the invention is also useful in disc drives having other types of actuators, such as linear actuators.

Figure 2:
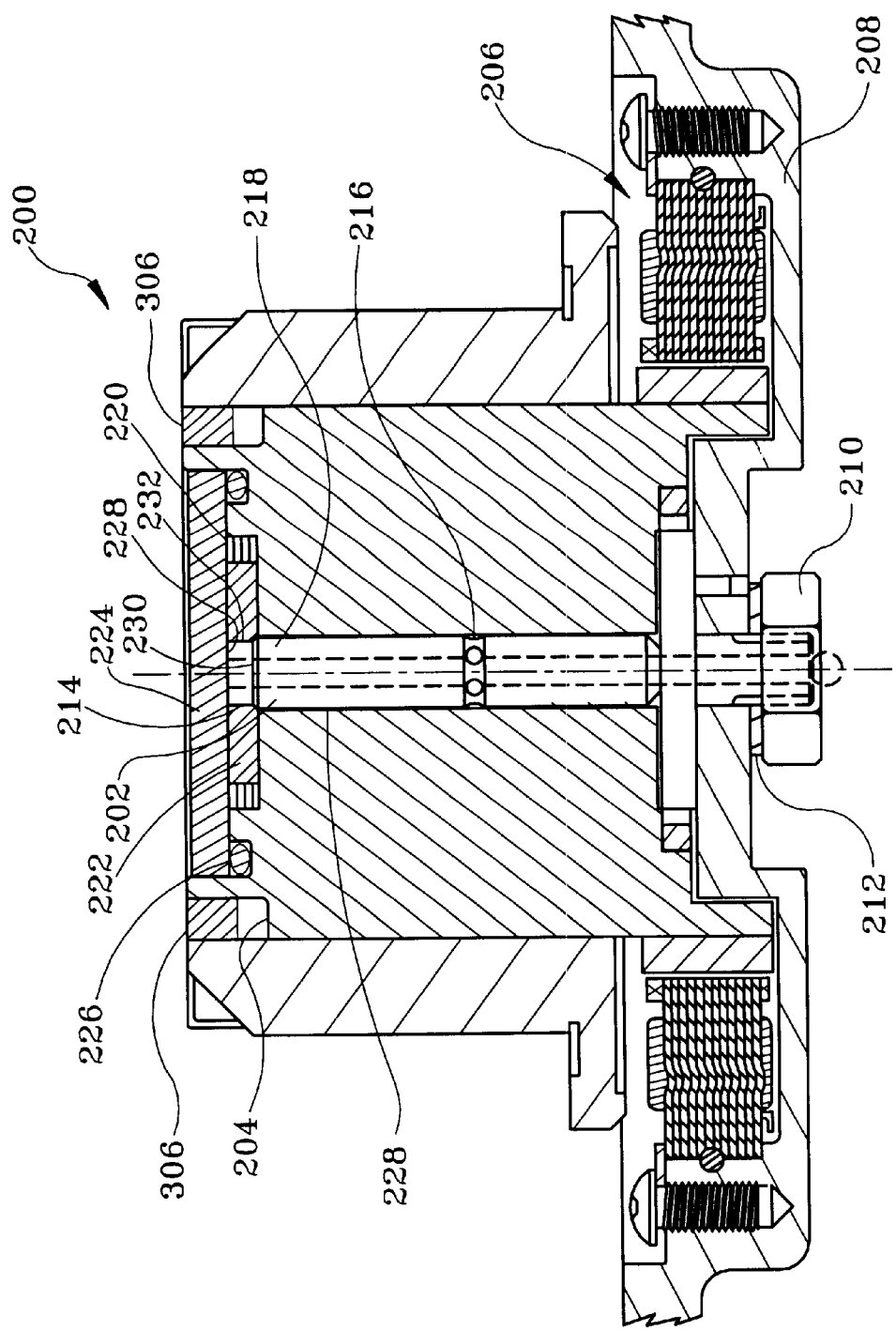
FIG. 2 is a sectional view of an isolated hydrodynamic bearing spindle motor in accordance with the present invention.

FIG. 2 is a sectional view of a hydrodynamic bearing spindle motor 200 in accordance with the invention. Spindle motor 200 comprises a stationary shaft 202, a rotor hub 204 and a stator 206. The shaft 202 is fixed and attached to base 208 using a nut 210 and a washer 212, where the nut 210 is positioned on a threaded end of the shaft 202. The rotor hub 204 is supported by the shaft 202 using a hydrodynamic bearing 214. The bearing 214 facilitates rotation of the hub 204 about shaft 202. The hydrodynamic bearing 214 includes a radial working surface 216 and axial working surfaces 218 and 220.

The spindle motor 200 further comprises a radial bearing 222 that forms the axial working surfaces 218 and 220 of hydrodynamic bearing 214. A thrust bearing counterplate 224 cooperates with the working surface 218 to provide axial stability for the hydrodynamic bearing and to position the rotor hub 204 within the spindle motor 200. An o-ring 226 is provided between the thrust bearing counterplate 224 and the rotor hub 204 to seal the hydrodynamic bearing 214. The o-ring 226 prevents hydrodynamic fluid 228 from escaping between the thrust bearing counterplate 224 and the rotor hub 204. The invention sets a gap 230 between the counterplate 224 and the end 232 of the shaft 202. The present invention is useful with this and other forms of hydrodynamic bearings and is not limited to use with this particular configuration of electric motor.

Figure 3A:
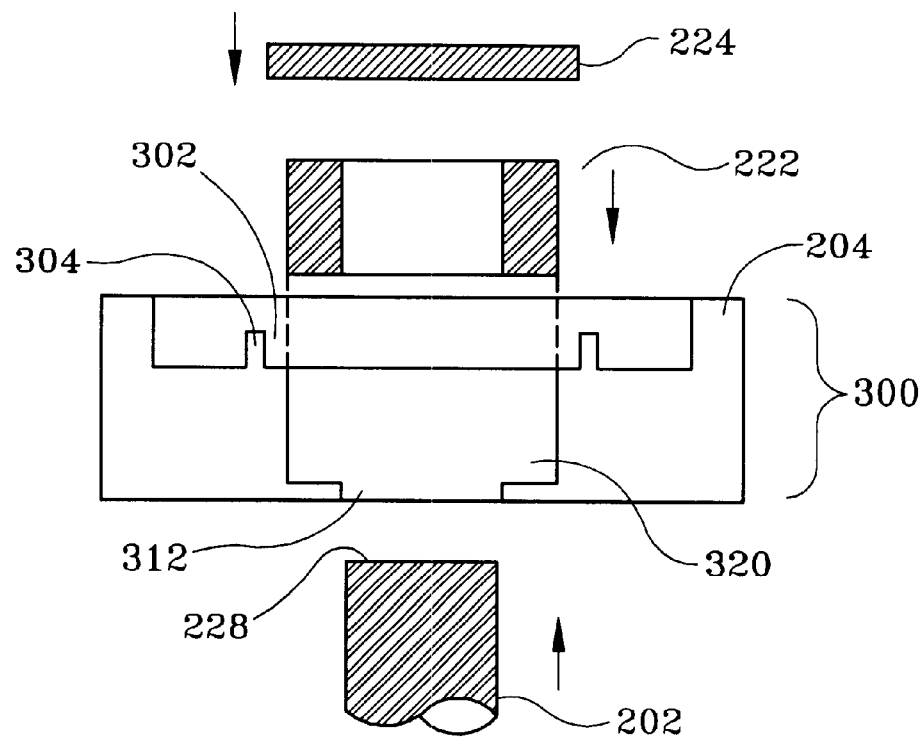
FIGS. 3A–3D is a series of sectional motor assembly views that represent a sequence of steps to set bearing gaps in an electric motor according to one embodiment of the present invention.

FIGS. 3A–3D are a series of simplified schematic drawings representing a process for setting the bearing gaps in an electric motor according to one embodiment of the present invention. For clarity, this series depicts a simplified representation of the top portion 300 of the rotor hub 204. In this embodiment, the main components of the rotor hub 204 are assembled before a compressive force is applied to the thrust bearing counterplate 224 to set a gap between the counterplate 224 and the shaft 202. The first step, as shown in FIG. 3A, depicts the upper portion 300 of the rotor hub 204, the shaft 202, a radial bearing 222 and the counterplate 224. As provided, the rotor hub 204 has a plurality of features formed within it for housing various elements such as a shaft 202, radial bearing 222 and a thrust bearing counterplate 224, for example. The rotor hub 204 is designed to align an end 228 of the shaft 202 in a coplanar orientation with the bottom of a counterplate recess 302 formed in the rotor hub 204. The shaft 202 enters the rotor hub 204 via a shaft support aperture 312 formed vertically through the rotor hub 204. Next, the radial bearing 222 is positioned in bearing recess 320 to circumscribe a portion of the shaft 202 that extends into recess 320. Lastly, the thrust bearing counterplate 224 is placed within counterplate recess 302 and on top of the radial bearing 222 in order to retain the radial bearing 222 in the rotor hub 204.

Figure 3B:
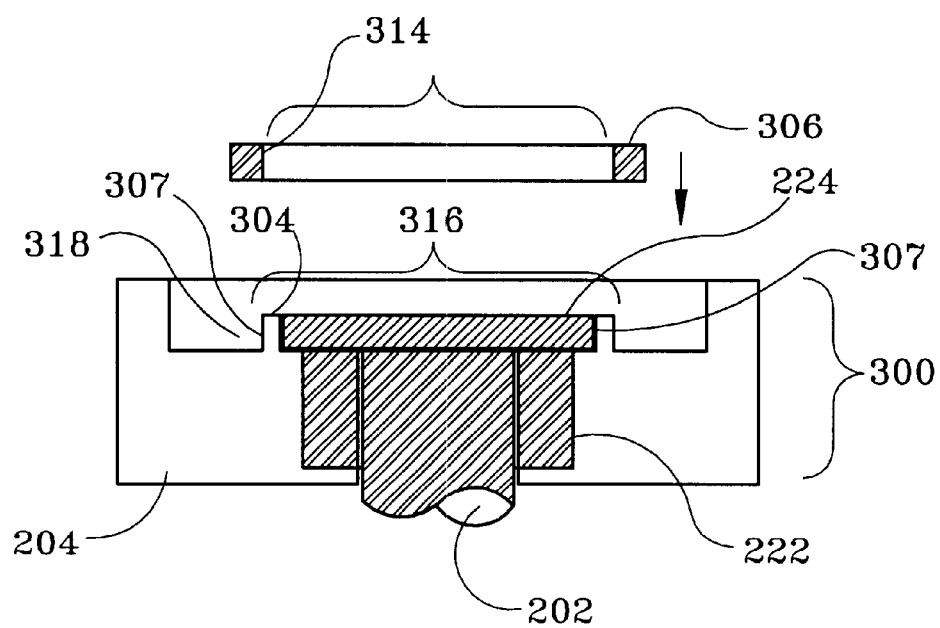

FIG. 3B depicts a press-force ring 306 being aligned and pressed over an annular retaining flange 304 into a circumferential recess 318 of the hub 204 that retains the thrust bearing counterplate 224. The press-force ring 306 is formed such that the internal diameter of the ring 314 is slightly smaller than the outer diameter 316 of the retaining flange 304 of the rotor hub 204. By forming the press-force ring 306 with an internal diameter 314 that is smaller than the outer diameter 316 of the retaining flange 304, the ring 306 must be pressed in place. Because the press-force ring 306 must be pressed into place, it will, in turn, place a significant amount of inwardly compressive pressure against the retaining flange 304. This pressure placed inwardly against the retaining flange 304 is transmitted to the circumferential edge 307 thrust bearing counterplate 224.

Figure 3C:
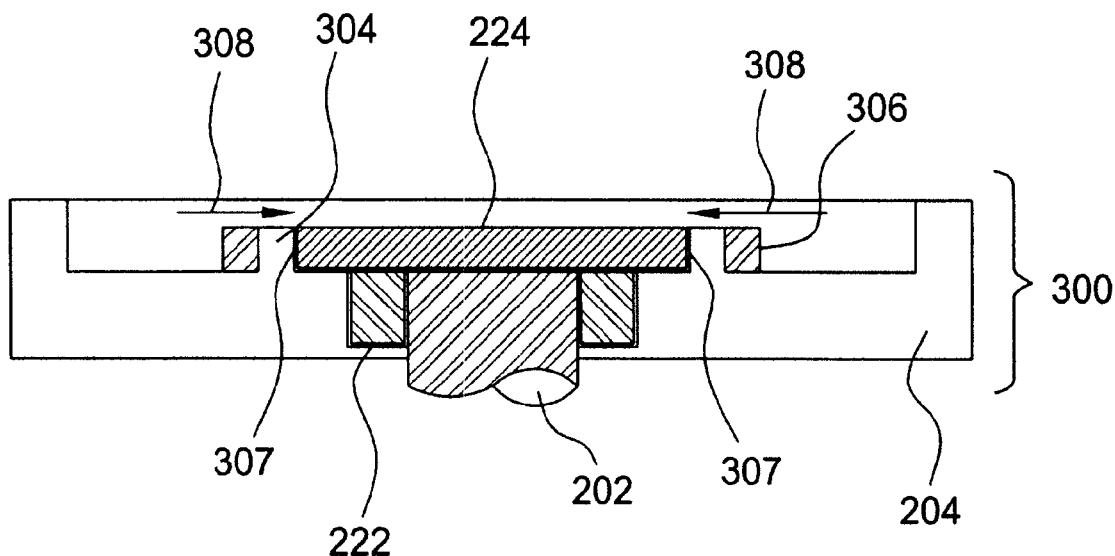

FIG. 3C depicts the direction of force (arrows 308) being exerted from the press-force ring 306 into the retaining flange 304 and into the thrust bearing counterplate 224. The lines of force extend inward from the outer diameter of the thrust bearing counterplate 224 in the direction of the center of the thrust bearing counterplate 224. As such, inwardly directed force is communicated from the press-force ring 306 to the thrust bearing counterplate 224.

Figure 3D:
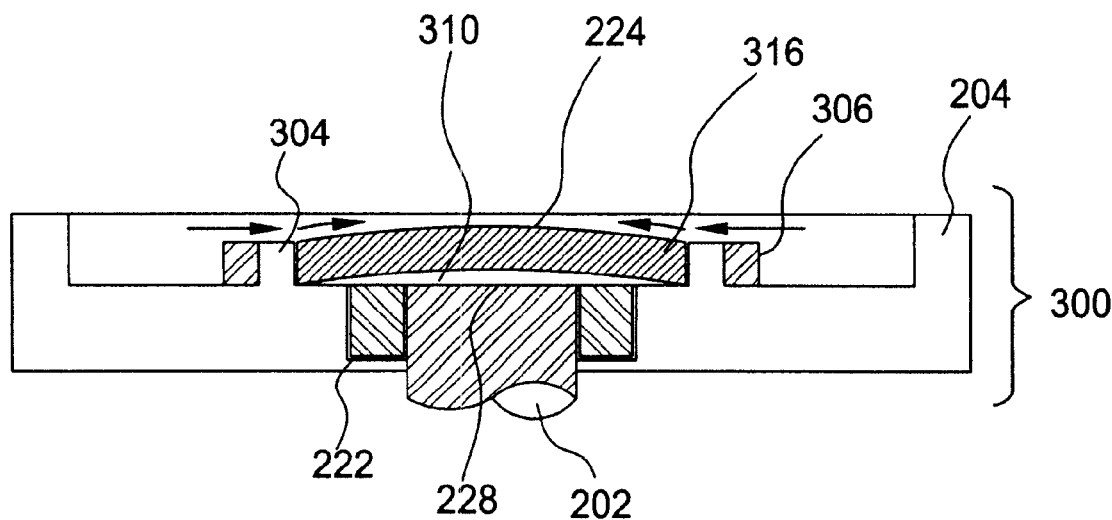

FIG. 3D depicts the effect of the press-force ring 306 on the thrust bearing counterplate 224. The deformation shown creates the gap 310, approximately 2–7 $\mu$m in width, between the end 228 of the shaft 202 and a bottom surface 316 of the thrust bearing counterplate 224. The amount of deformation is dependent upon the size, shape and material of the press-force ring 306, the rotor hub 204 and the thrust bearing counterplate 224. The materials used for the rotor and the thrust bearing counterplate can be any combination of different types of stainless steal. The ring can be made of any appropriate type of material. The amount of deformation that occurs in the thrust bearing counterplate 224 is predictable, precise and repeatable, such that the gap 310 is predictable, precise and repeatable.

Figure 4A:
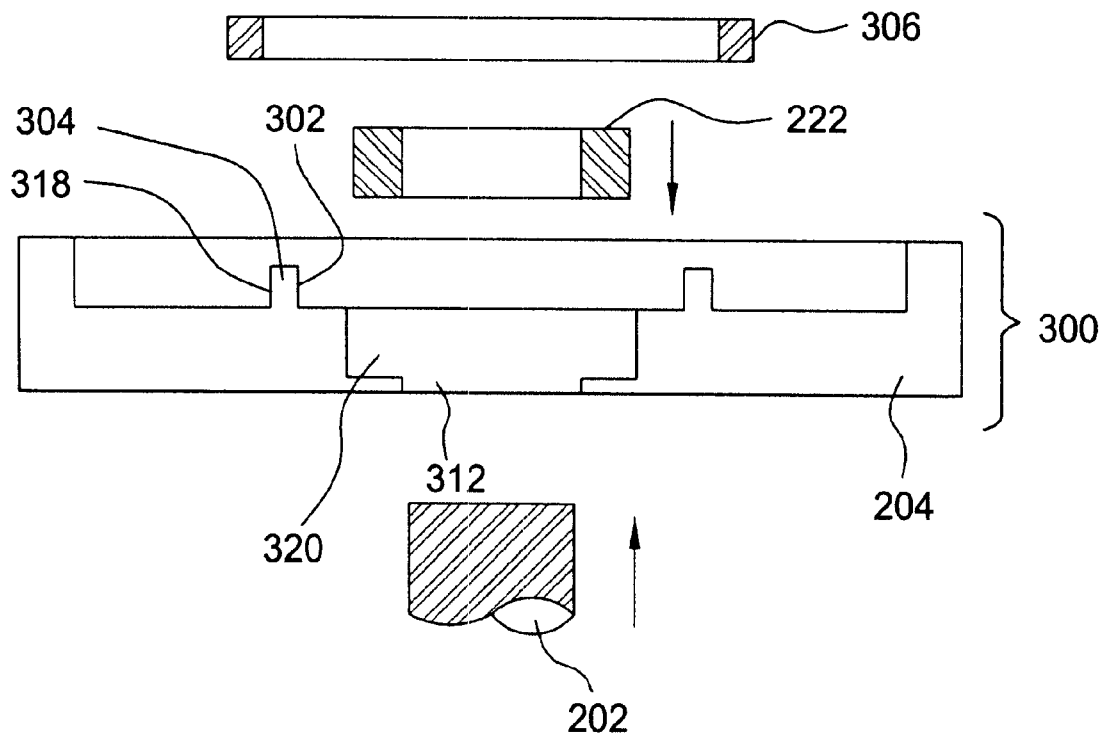
FIGS. 4A–4E is a series of sectional motor assembly views that represent a sequence of steps to set bearing gaps in an electric motor according to another embodiment of the present invention.

FIGS. 4A–4E are a series of simplified schematic views of a motor assembly representing a process for setting bearing gaps in an electric motor according to another embodiment of the present invention. In this embodiment, a rotor shaft 202 is fitted through shaft support aperture 312 of a rotor hub 204 into a radial bearing 222, after which a press-force ring 306 is removably affixed to a recessed feature 318 located in the top portion of the rotor hub 300 (as depicted in FIG. 4A). The press-force ring 306 compresses the retaining feature 304 of the rotor hub 222 such that the recess 302 is smaller than the diameter of the thrust bearing counterplate 224.

Figure 4B:
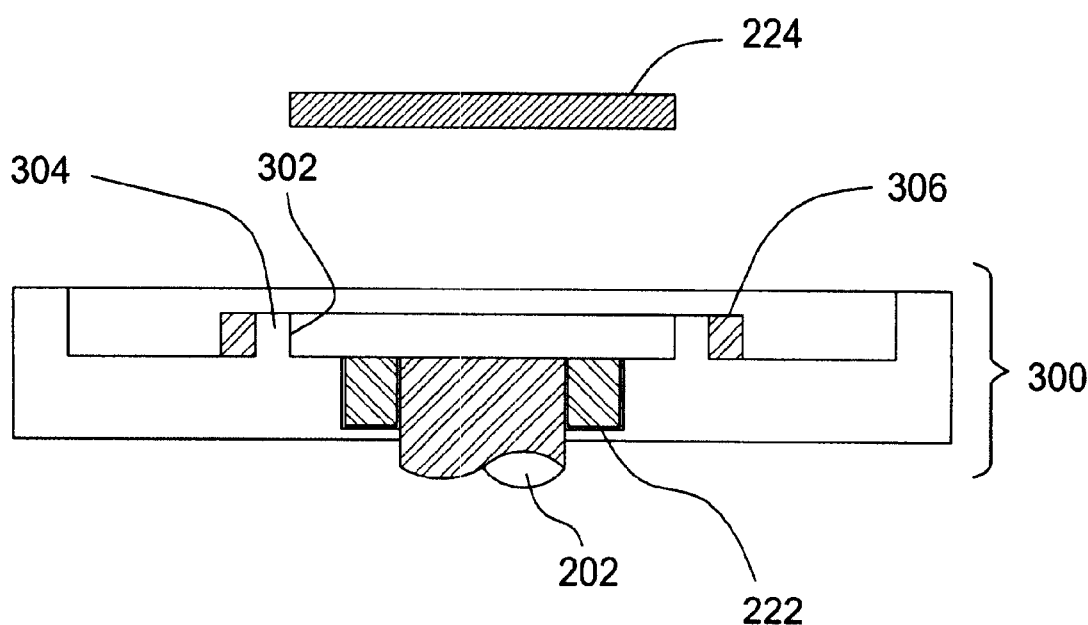

The second step in this embodiment (as shown in FIG. 4B) is to press the thrust bearing counterplate 224 into the counterplate recess 302 of the rotor hub 204. The recess 302 of the rotor hub 204 is, as in the previous example, located directly above the rotor shaft 202 and bearing recess 320, respectively. Because the diameter of the rotor hub's recess 302 is smaller than that of the diameter of the thrust bearing counterplate 224, a significant amount of force is required to press the thrust bearing counterplate 224 into the recess 302 of the rotor hub 204.

Figure 4C:
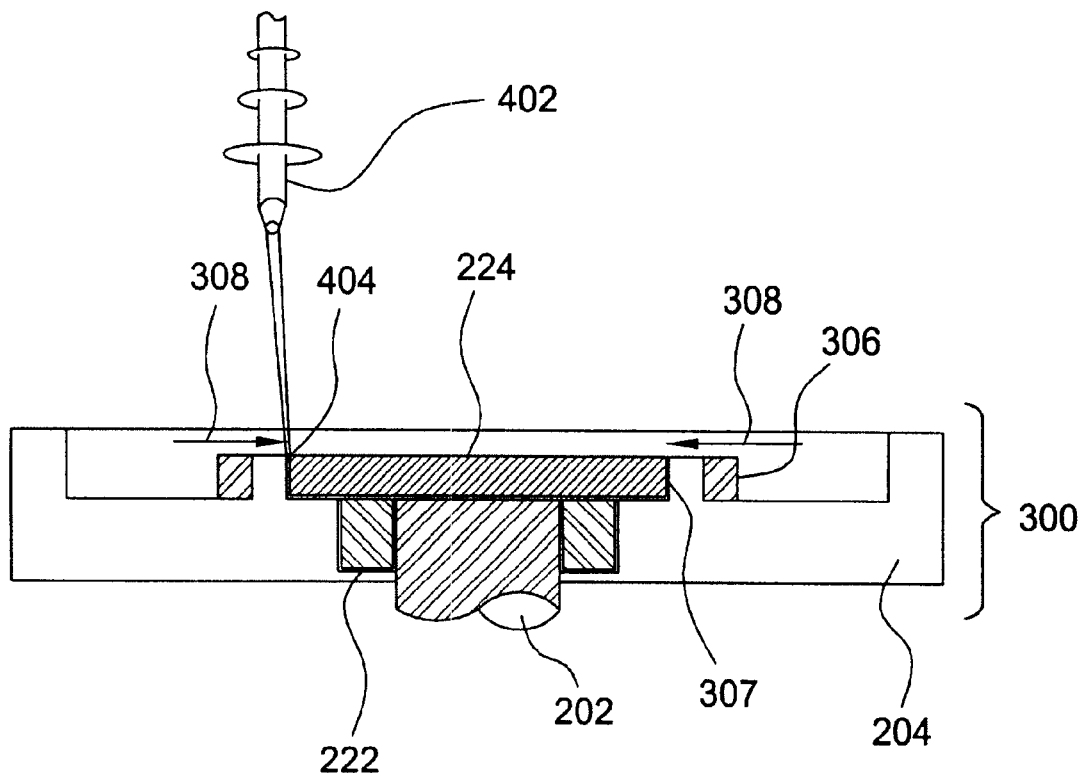
Figure 4D:
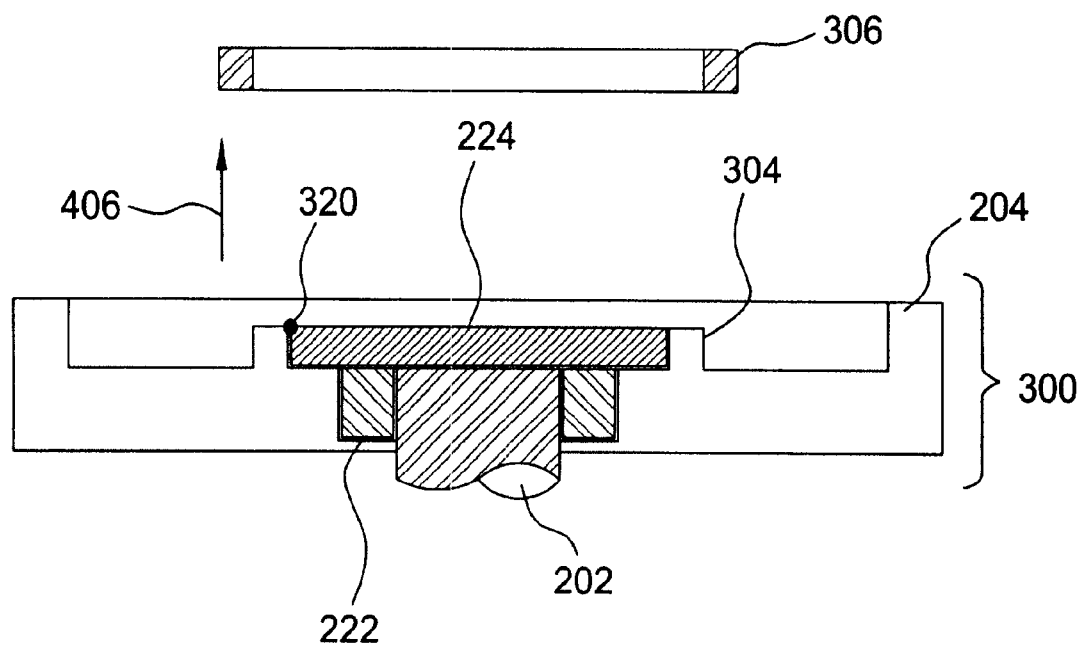

Once pressed in place, the thrust bearing counterplate 224 is subject to the compression forces of the press-force ring 306, as in the previous embodiment. As such, the forces from the press-force ring 306 cause the thrust bearing counterplate 224 to deform. After being pressed into place, the thrust bearing counterplate 224 is laser-welded by a laser 402 to the rotor hub 204 as seen in FIG. 4C.

Figure 4E:
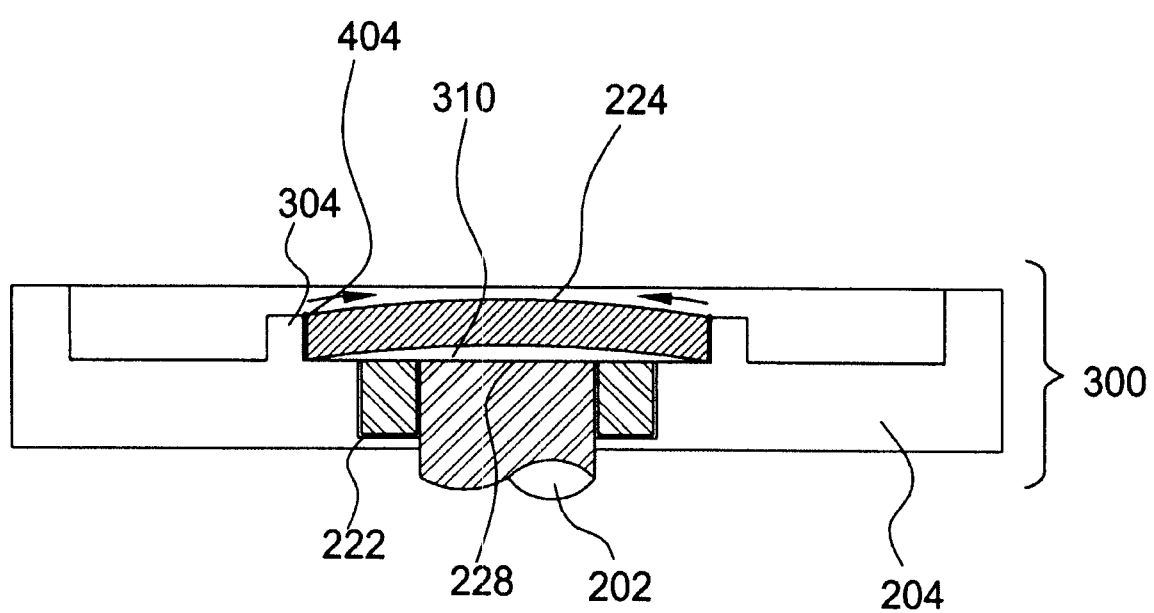

After the laser welding is completed, the welds 404 are allowed to cool. When cool, the press-force ring 306 is removed as depicted by arrow 406 in FIG. 4D. The compressive force originally exerted by the press-fit ring 306 is made permanent by the welds 404 (as shown in FIG. 4E) such that the deformation of the thrust bearing counterplate 224 is maintained in the same position that it was previously in when the press-force ring 306 was installed. The bearing gap 310 is precise and repeatable.

Figure 5A:
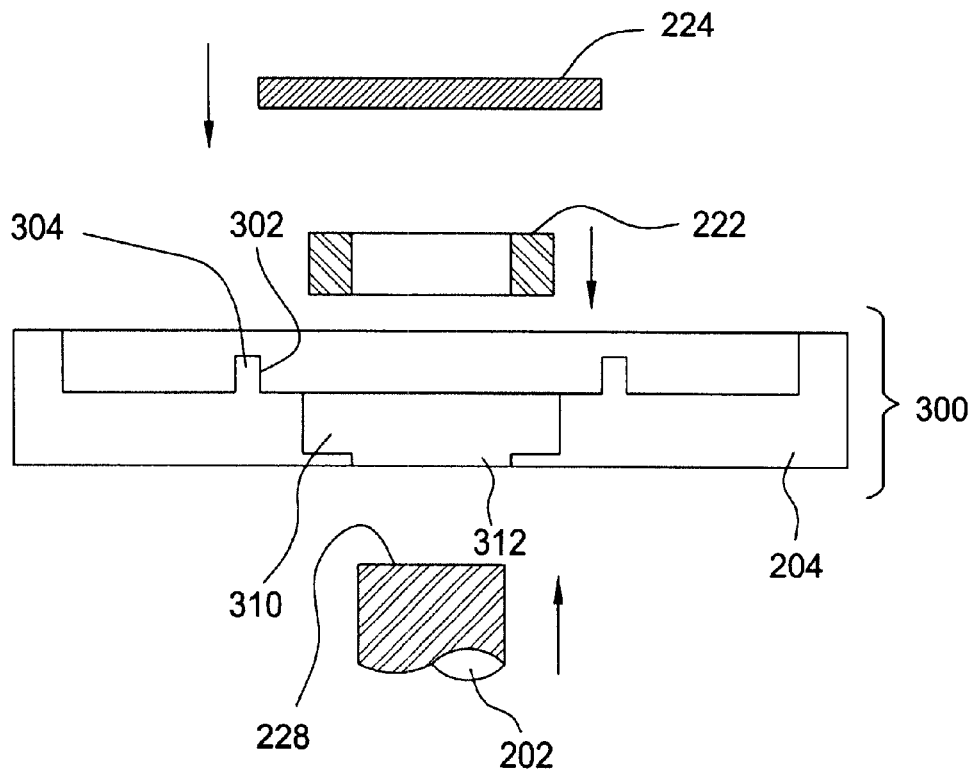
FIGS. 5A–5C is a series of sectional motor views that represent a sequence of steps to set bearing gaps in an electric motor according to another embodiment of the present invention.
Figure 5B:
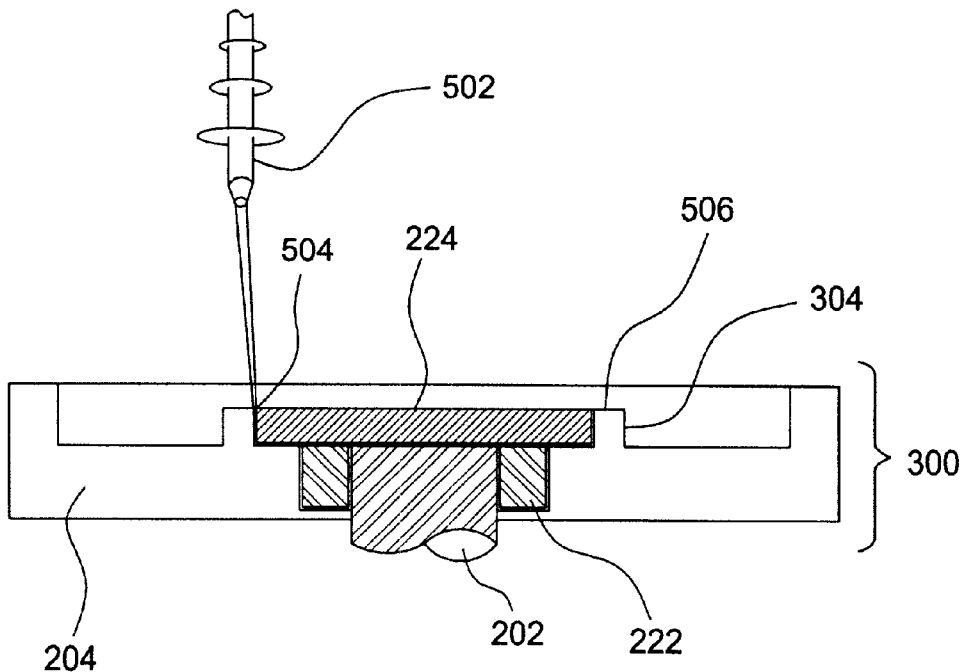
Figure 5C:
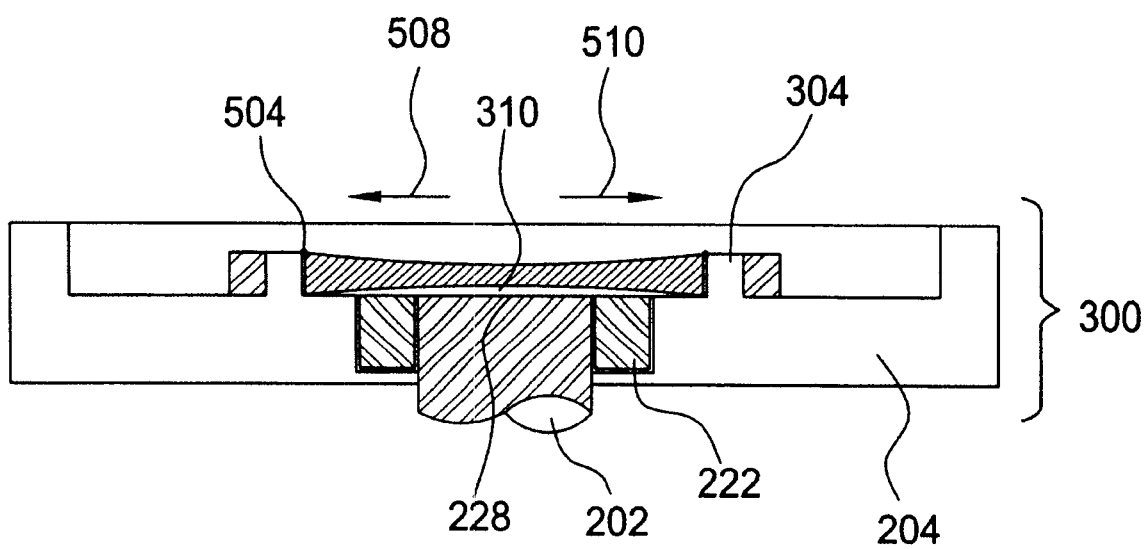

FIGS. 5A–5C are a series of sectional views of a motor assembly representing a process for setting bearing gaps in an electric motor according to another embodiment of the present invention.

In this embodiment of the present invention, a rotor hub 204 is provided along with a radial bearing 222, a shaft 202 and a thrust bearing counterplate 224. As in the previous embodiments, the rotor shaft 202 is inserted through an aperture 312 in the rotor hub 204 where it is circumscribed by a radial bearing 222. After the shaft 202 has been positioned in the radial bearing 222 in the rotor hub 204, the thrust bearing counterplate 224 is installed in the counterplate recess 302 of the rotor hub 204. Once the thrust bearing counterplate 224 has been installed within the recess 302 defined by the annular retaining flange 304, it is then laser-welded in place by laser 502, thus permanently affixing the thrust bearing counterplate 224 to the rotor hub 204 (as seen in FIG. 5B).

The laser-weld 504 follows the entire circumferenced edge 506 of the upper portion of the counterplate 224 and bonds the entire circumferential edge 506 of the counterplate 224 to the retaining flange 304 of the rotor hub 204. As the weld 504 begins to cool, the rotor hub 204 begins to shrink. As shown in FIG. 5C, this shrinkage in the welded materials creates a radial tensional force, as depicted by arrows 508 and 510, that deforms the counterplate 224, thus creating the bearing gap 310 between the counterplate 224 and the rotor shaft 202. Assuming both the laser-weld 504 and the cooling step are uniform, the tensional deformation will also be uniform. Thus, the bearing gap 310 between the thrust bearing counterplate 224 and the rotor shaft 202 will be precise and uniform.

Although various embodiments which incorporate the teachings of the present invention have been shown and described in detail herein, those skilled in the art can readily devise many other varied embodiments that still incorporate these teachings.

What is claimed is:

1. A method for setting a gap in the hydrodynamic bearings of an electric motor, said method comprising:
    (a) placing an end of a shaft into a shaft support aperture of a rotor hub;
    (b) fitting a thrust bearing counterplate into a counterplate recess defined by an annular retaining flange that is proximate the end of said shaft; and
    (c) deforming the thrust bearing counterplate to form a gap between the end of the shaft and a surface of the thrust bearing counterplate.

2. The method according to claim 1, wherein the deforming step further comprises:
    press fitting a press-force ring around the annular retaining flange.

3. The method according to claim 1, wherein the deforming step further comprises:
    (a) press fitting a press-force ring around the annular retaining flange;
    (b) fitting a thrust bearing counterplate into the counterplate recess;
    (c) welding the thrust bearing counterplate into the counterplate recess; and
    (d) removing the press-fit ring.

4. The method according to claim 1, wherein the deforming step comprises:
    welding the thrust bearing counterplate into the counterplate recess.

* * * * *